Figure 1:
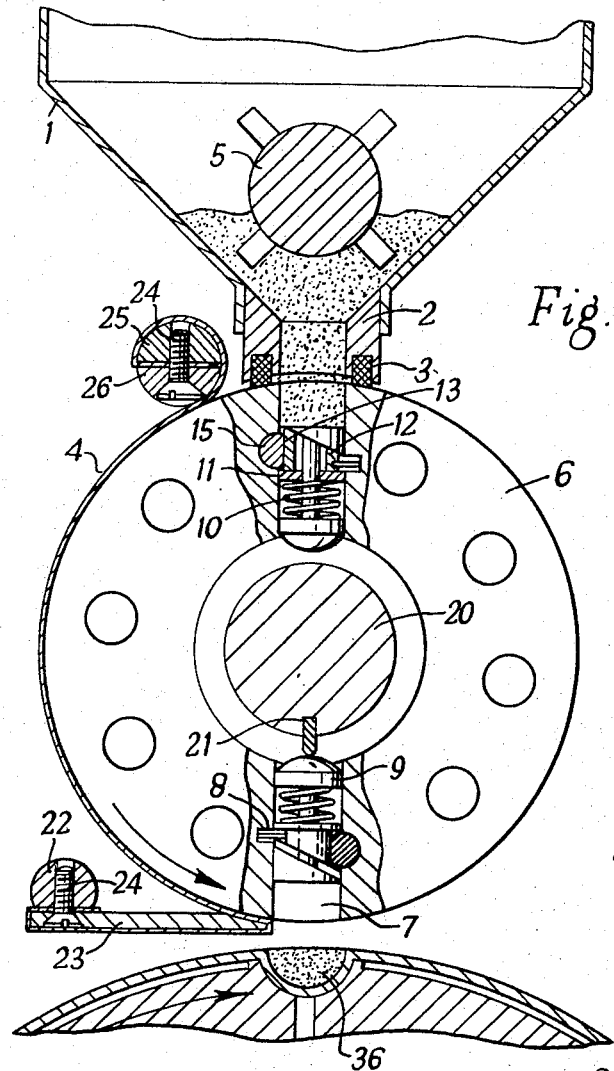

Nov. 21, 1967  M. K. MEHTA  3,353,722
APPARATUS FOR MEASUREMENT AND FEEDING OF POWDERED MATERIALS
Filed June 30, 1965  2 Sheets-Sheet 1

INVENTOR
MAHARAJ KRISHEN MEHTA

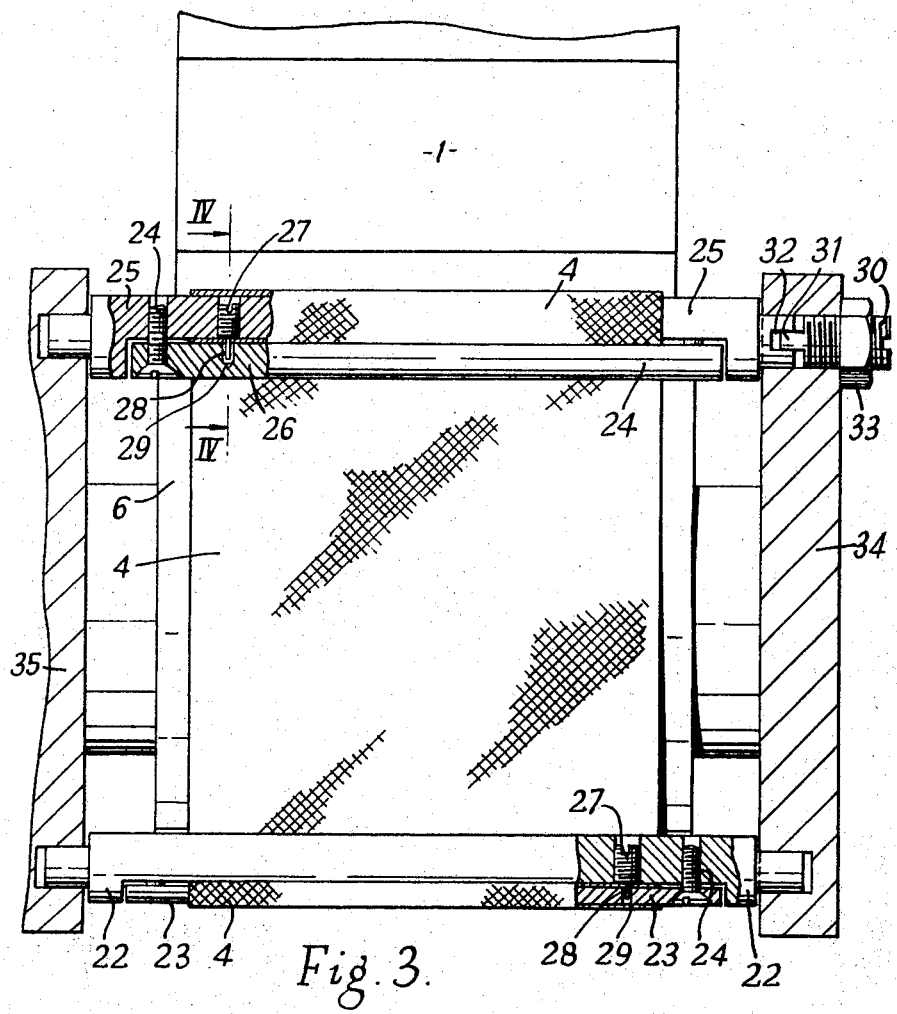
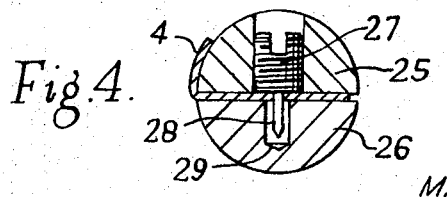
Fig. 3.
Fig. 4.
INVENTOR
MAHARAJ KRISHEN MEHTA

United States Patent Office 3,353,722
Patented Nov. 21, 1967

3,353,722
APPARATUS FOR MEASUREMENT AND FEEDING OF POWDERED MATERIALS
Maharaj Krishen Mehta, 279 Celyn Ave., Lakeside, Glamorgan, Cardiff, Wales
Filed June 30, 1965, Ser. No. 468,515
Claims priority, application Great Britain, July 8, 1964, 28,210/64
8 Claims. (Cl. 222—218)

This invention relates to an improved machine for accurate measurement and feeding of material, particularly materials in powder or granular form.

Various types of machines have been proposed and are in use for measuring and feeding of material in powder or granular form. British patent specification No. 881,022 describes a machine including a feed roll contained and revolving within a hopper and having on its periphery axial and circumferential rows of charge chambers or holes, each hole having a spring-loaded ejector, the cam actuated outward movement of which ensures that the charge of powder or granules is dislodged when the hole reaches the feeding position and the charge is deposited in capsule halves.

A machine of this type has, however, certain drawbacks, such as: (a) that once the feed mechanism is installed and put into operation the charge chambers or holes in the feed roll have a fixed volume with the result that the said feed mechanism has to be disassembled, adjusted and reassembled for every change, however small, of the dosage or quantity of the fill material (b) that even for a fixed dosage or quantity of fill material minor adjustment to control the quantity to within plus or minus 1 or 2 percent is not possible (c) that the close fit between the feed roll and the hopper within which the feed roll rotates for retaining the charge of powder from the intake to the discharge position necessitates a high degree of precision in manufacture and fitting and (d) no adjustments can be made for wear between the feed roll and the hopper within which it rotates.

This invention relates to an improved machine whereby dosage of material to be fed in powder or granular form may be varied within predetermined limits, and each predetermined dosage may be varied to obtain a close accuracy during operation.

The apparatus in accordance with the invention is characterized by means for adjusting the inner position of the ejector to vary the free volume of the charge chamber and thereby vary the quantity of material measured out by the charge chamber.

Preferably each ejector has an inclined surface which rests against a similarly inclined surface of an adjusting member movable transversely to the direction of movement of the ejector. The adjusting member may have a second inclined surface engageable by an operating member movable in a direction parallel to the axis of the feed roll and common to a number of charge chambers arranged in a row extending parallel to the axis of the roll. The operating member is preferably a spring-loaded rod which is adjustable against the spring by a screw and has notches presenting inclined surfaces for engagement with the second inclined surfaces of the adjusting members.

To ensure retention of the material in the charge chambers between the intake and discharge positions a charge retention sheet is held against the periphery of the feed roll. The tension of the sheet is preferably adjustable during operation to allow for wear and other changes in conditions.

Figure 2:
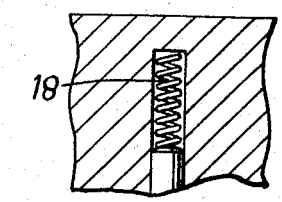
Figure 2:
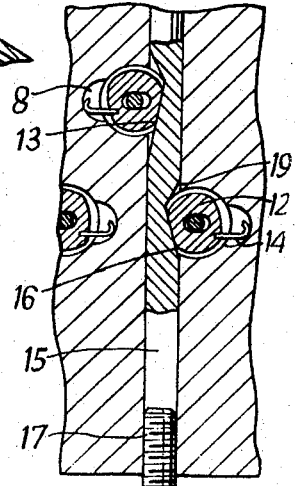

By way of example, one embodiment of the invention will now be described with reference to the accompanying drawings in which:

FIG. 1 is a front elevation, largely in section, of an apparatus in accordance with the invention for dispensing measured quantities of powdered or granular materials, FIG. 2 is a longitudinal section of the mechanism for adjusting the ejectors in the apparatus of FIG. 1, FIG. 3 is a side elevation, partially in section, of the apparatus of FIG. 1 seen from the left-hand side, and FIG. 4 is a section on the line IV—IV of FIG. 3 showing a detail of the mounting of the charge retention sheet on a larger scale.

The apparatus shown in the drawings has a medicine hopper 1 supported on a mouth 2 which is fitted with a seal 3 engaging the periphery of a rotatable feed roll 6. The feed roll 6 has on its periphery an axial and circumferential row of charge chambers 7, with spacing such as to coincide with the spacing of formed capsule halves on a rotatable die roll, or of openings in containers on a moving conveyor belt wherein material is to be deposited below the hopper. Each charge chamber 7 has a spring-loaded ejector 9 contained within it, the head of which is seated on a loose fitting adjusting member or tapered washer 12, which is in turn seated on a stationary ring 11. The ejector is held in position by a compression spring 10. The ejector 9 is forced down on the spring 10 when the hemispherical bottom of the ejector 9 rides on a cam 21 which extends along the length of a stationary shaft 20. The hopper 1 also contains a rotatable agitator 5.

Referring to FIG. 2, an operating member or rod 15 in a passage 19 is retained between a compression spring 18 at the rear end of the passage 19 and a screw 17 at the front end of the passage 19. The clockwise movement of the screw 17 moves the rod 15 towards the rear end of the feed-roll 6 in the passage 19 and the counter-clockwise movement of the screw moves the rod 15 towards the front end of the feed roll 6 in the passage 19. The tapered washers 12 have tapered sides 13, which engage with tapered notches 16 on the rod 15 in the passage 19, which lies between two adjoining offset rows of charge chambers 7. The rod 15 has the notches 16 on both sides for engaging the tapered sides 13 on the tapered washers 12 in the two adjoining offset rows of charge chambers.

Spring wires 14 are secured to the tapered washers 12 and enter recesses 8 in the walls of the charge chambers 7, so that the tapered washers are held in position against the tapered notches 16 on the rod 15. The movement of the rod 15 towards the rear end of the feed roll 6 moves the tapered washer 12 transversly in a direction away from the rod 15, so that the ejector 9 moves outwards, thereby reducing the free volume of the charge chamber 7. The movement of the rod 15 towards the front end of the feed roll 6 moves the tapered washer 12 transversely in a direction towards the rod 15, so that the ejector 9 moves inwards, thereby increasing the free volume of the charge chamber 7. The shape and size of the charge chamber 7 may be varied to suit the capsule halves and containers to be filled.

The feed roll 6, charge chamber 7, ejector 9, ring 11, tapered washer 12 and rod 15 may be adapted to provide dosage for two or three sizes of capsules with adjustment of the outward and inward movement of the said ejector 9. The volume of the charge chamber 7 may be pre-set for a particular dosage within the designed limit. Minor adjustments in the volume of charge chamber 7 may be made during operation to obtain the desired accuracy.

A charge retention sheet 4 made of woven nylon, coated or uncoated fabric, or fine stainless steel bronze or brass wire mesh or like material is held against the feed roll 6. The charge retention sheet 4 is supported at the top end by an upper bracket rod 25, upper bracket securing plate 26, end screws 24 and intermediate screws 27 with integral pins 28. The charge retention sheet 4 is supported at the bottom end by lower bracket rod 22, lower swingable bracket securing plate 23, and screws 24 and intermediate screws 27 with integral pins 28. The integral pins 28 on the intermediate screws 27 pierce the charge retention sheet 4 and enter clearance holes 29 in the upper bracket securing plate 26 and the lower swingable bracket securing plate 23. The upper bracket rod 25 and the lower bracket rod 22 are journalled in a rear plate 35 and a front plate 34. The front end of the upper bracket rod 25 has a slot 32, which is engaged by a tongue 31 on a screw 30, which is locked in position by a nut 33. The counter-clockwise rotation of the screw 30 tightens the charge retention sheet 4 against the feed roll 6, swinging the plate 23 against the periphery of the roll 6.

The machine illustrated in the drawings operates as follows:

As the feed roll 6 revolves, the axial rows of charge chambers 7 reach the intake or charge receiving position below the revolving agitator 5. The volume of the charge chambers 7 has been pre-set with the help of the screws 17 and the rods 15 to contain the desired quantity of charge. The emptying of the full charge contained in the charge chamber 7 into formed capsule halves 36, or containers on a moving conveyor belt (not shown), below the medicine hopper 1 takes place as the axial rows of charge chamber 7 reach the discharge position diametrically below the intake position. The slight cam controlled outward movements of the spring-loaded ejector 9 ensure that the complete charge is dislodged from the charge chamber 7. Adjustments in the volume of the charge chamber 7 are made by turning the screw 17 clockwise or counter-clockwise during operation to obtain desired accuracy in dosage.

The charge retention sheet 4 held against the feed roll 6 ensures that the charge is retained in the charge chambers from the intake to the discharge position.

The tension of the charge retention sheet 4 against feed roll 6 is adjusted during operation by the screw 31.

While in the apparatus described the material is retained in the charge chambers by a flexible charge retention sheet, it is also possible to operate the feed roll within a closely fitting housing, which may be wholly or partially lined with a resilient material such as soft rubber. The use of a flexible sheet is preferred since it provides simplicity in construction and adjustability in operation.

I claim:

1. Apparatus for dispensing measured quantities of powdered or granular material comprising a hopper for said material, a rotary feed roll mounted below the hopper, the periphery of the feed roll having charge chambers arranged in rows parallel to the axis of rotation of the feed roll, an ejector within each charge chamber, said ejector being displaceable from an inner position to an outer position to ensure the discharge of the material, an adjusting member associated with each ejector and having first and second inclined surfaces, said first inclined surface engaging a similarly-inclined surface of the ejector when the ejector is in its inner position, said adjusting member being movable transversely to the direction of movement of the ejector whereby the inner position of the ejector can be adjusted, and an operating member movable in a direction parallel to the axis of said feed roll and engaging said second inclined surface of the adjusting member of each of the charge chambers in one row to effect said transverse movement of the adjusting members.

2. Apparatus as claimed in claim 1 in which the operating member is common to two axial rows of charge chambers.

3. Apparatus as claimed in claim 1 in which the operating member is a rod having notches presenting inclined surfaces for engagement with the second inclined surfaces of the adjusting members.

4. Apparatus as claimed in claim 3 having a spring loading the rod and a screw for adjusting the rod against the spring.

5. Apparatus as claimed in claim 1 including a flexible charge retention sheet and tensioning means holding said sheet against the periphery of the rotary feed roll to ensure retention of the material in the charge chambers between the hopper and the discharge position.

6. Apparatus as claimed in claim 5 including means for adjusting the tension of the charge retention sheet against the feed roll.

7. Apparatus as claimed in claim 6, in which said tensioning means comprises a swingable plate having an edge thereof located against the periphery of the roll, and a rotatable support spaced from said swingable plate around the periphery of the feed roll, said sheet being attached at one end to said plate and passing around the said edge onto the periphery of the roll and being attached at its other end to said rotatable support whereby the tension of the sheet may be adjusted.

8. Apparatus for dispensing measured quantities of powdered or granular material comprising a hopper for said material, a rotary feed roll mounted below the hopper, the periphery of the feed roll having charge chambers for conveying said material to a discharge position, a flexible charge retention sheet and tensioning means holding said sheet against the periphery of the rotary feed roll to ensure retention of the material in the charge chambers between the hopper and the discharge position, said tensioning means comprising a swingable plate having an edge thereof located adjacent the periphery of the roll, and a rotatable support spaced from said swingable plate around the periphery of the feed roll, said sheet being attached at one end to said plate and passing around the said edge onto the periphery of the roll and being attached at its other end to said rotatable support whereby the tension of the sheet may be adjusted.

References Cited

UNITED STATES PATENTS

| | | | |
|---|---|---|---|
| 709,793 | 9/1902 | McGinnity | 222—345 X |
| 1,760,407 | 5/1930 | Hebebrand | 222—292 |
| 2,871,805 | 2/1959 | Behnen | 222—368 X |
| 2,913,018 | 11/1959 | Lewis et al. | 141—284 X |
| 3,065,879 | 11/1962 | Jennings et al. | 222—438 X |
| 3,231,105 | 1/1966 | Easley | 222—368 |

FOREIGN PATENTS

| | | |
|---|---|---|
| 5,311 | 3/1905 | Great Britain. |

ROBERT B. REEVES, *Primary Examiner.*

N. L. STACK, *Assistant Examiner.*